United States Patent
Swanson

(10) Patent No.: US 11,479,517 B2
(45) Date of Patent: Oct. 25, 2022

(54) EXPLOSIVE FORMULATIONS OF MIXTURE OF CARBON DIOXIDE AND A REDUCING AGENT AND METHODS OF USING SAME

(71) Applicant: Daren Normand Swanson, Burlington (CA)

(72) Inventor: Daren Normand Swanson, Burlington (CA)

(*) Notice: Subject to any disclaimer, the term of this patent is extended or adjusted under 35 U.S.C. 154(b) by 0 days.

(21) Appl. No.: 13/923,659

(22) Filed: Jun. 21, 2013

(65) Prior Publication Data
US 2016/0046538 A1 Feb. 18, 2016

Related U.S. Application Data

(63) Continuation-in-part of application No. 12/809,917, filed as application No. PCT/CA2008/002198 on Dec. 22, 2008, now Pat. No. 8,506,920.
(Continued)

(51) Int. Cl.
C06B 43/00 (2006.01)
C06B 25/34 (2006.01)
(Continued)

(52) U.S. Cl.
CPC ............ *C06B 43/00* (2013.01); *C01B 32/184* (2017.08); *C01B 32/25* (2017.08); *C01B 32/26* (2017.08);
(Continued)

(58) Field of Classification Search
None
See application file for complete search history.

(56) References Cited

U.S. PATENT DOCUMENTS 3,121,036 A * 2/1964 Cook ................... C06B 47/14
149/21
3,288,658 A * 11/1966 Ferguson ............. C06B 47/14
149/2
(Continued)

FOREIGN PATENT DOCUMENTS

IN 2004DE00475 A 5/2006
RU 2036835 C1 6/1995
(Continued)

OTHER PUBLICATIONS

Isoda et al.; Ignition and Combustion of Metals in a Carbon Dioxide Stream; Symposium (International) on combustion; vol. 22, Issue 1, 1989, pp. 1635-1641; 1989.*
(Continued)

*Primary Examiner* — Guinever S Gregorio
(74) *Attorney, Agent, or Firm* — Jansson Munger McKinley & Kirby Ltd.

(57) ABSTRACT

The disclosure relates to embodiments of an explosive formulation comprising a detonable mixture of an oxidizing agent such as carbon dioxide, and a material that decomposes the oxidizing agent exothermically (a reducing agent), and additives that increase the mixture's shock sensitivity. The formulations may be used in a method to produce diamonds or nano oxides or in other applications that use traditional explosives such as, but not limited to: ammonium nitrate and fuel oil combinations (ANFO), watergel explosives, emulsion explosives and RDX.

25 Claims, 7 Drawing Sheets

Related U.S. Application Data

(60) Provisional application No. 61/008,632, filed on Dec. 21, 2007.

(51) Int. Cl.

| | | |
|---|---|---|
| *C01B 35/10* | (2006.01) | |
| *C01B 33/12* | (2006.01) | |
| *C01F 5/04* | (2006.01) | |
| *F42D 3/04* | (2006.01) | |
| *F42D 3/00* | (2006.01) | |
| *C01D 15/02* | (2006.01) | |
| *C01G 23/047* | (2006.01) | |
| *C01F 7/422* | (2022.01) | |
| *C01F 11/02* | (2006.01) | |
| *C01F 3/02* | (2006.01) | |
| *C01G 25/02* | (2006.01) | |
| *C01D 1/02* | (2006.01) | |
| *C01B 32/184* | (2017.01) | |
| *C01B 32/25* | (2017.01) | |
| *C01B 32/26* | (2017.01) | |

(52) U.S. Cl.
CPC ........... *C01B 33/12* (2013.01); *C01B 35/1036* (2013.01); *C01D 1/02* (2013.01); *C01D 15/02* (2013.01); *C01F 3/02* (2013.01); *C01F 5/04* (2013.01); *C01F 7/422* (2013.01); *C01F 11/02* (2013.01); *C01G 23/047* (2013.01); *C01G 25/02* (2013.01); *C06B 25/34* (2013.01); *F42D 3/00* (2013.01); *F42D 3/04* (2013.01)

(56) References Cited

U.S. PATENT DOCUMENTS

| | | | |
|---|---|---|---|
| 3,608,014 A | | 9/1971 | Balchan et al. |
| 4,033,264 A | * | 7/1977 | Bolza ...................... C06B 45/10 102/314 |
| 4,483,836 A | | 11/1984 | Adadurov et al. |
| 5,861,349 A | | 1/1999 | Vereschagin et al. |
| 8,506,920 B2 | | 8/2013 | Swanson |
| 2008/0317659 A1 | | 12/2008 | Dolmatov |
| 2009/0004092 A1 | | 1/2009 | Dolmatov |
| 2010/0254884 A1 | | 10/2010 | Shenderova |

FOREIGN PATENT DOCUMENTS

| | | |
|---|---|---|
| RU | 2041166 C1 | 8/1995 |
| RU | 2077377 C1 | 4/1997 |
| RU | 2102542 C1 | 1/1998 |

OTHER PUBLICATIONS

Definition shock sensitivity; https://en.wikipedia.org/wiki/Shock_sensitivity; Aug. 20, 2018.*
Pourmortazavi et al.; Application of Supercritical Carbon Dioxide in Energetic Materials Processes: A Review; Ind. Eng. Chem. Res.; 44, 6523-6533; 2005.*
Baker et al.; Metal-CO2 Propulsion System for Mars Missions; 2004.*
Daily; Combustion of Magnesium with Carbon dioxide and Carbon Monoxide at Low Gravity; Journal of Propulsion and Power; vol. 17, No. 4, Jul.-Aug. 2001.*
Tan et al.; On the Shock Sensitivity of Explosive Compounds with Small-Scale Gap Test; The Journal of Physical Chemistry A; 115, 10610-10616; 2011.*
Gang et al.; Experiment-Based Fire and Explosion Risk Analysis for Powdered Magnesium Production Methods; Journal of Loss Prevention in the Process Industries; 21, 461-465; 2008.*
MSDS: https://www.havingaparty.net.au/wp-content/uploads/2015/09/MSD_Dry_Ice.pdf; Sep. 2015.*
Definition detonate: M-W.com Aug. 16, 2021.*
Goehring; Explosive injury due to solid carbon dioxide; JAMA, p. 598-599; 122(9); 1943.*
Shafirovich, et al. "Magnesium and Carbon Dioxide: A Rocket Propellent for Mars Missions." Journal of Propulsion and Power. vol. 9. No. 2. Mar.-Apr. 1993. pp. 197-203.
Luman, et al. "Development and Characterization of High Performance Solid Propellants Containing Nano-Sized Energetic Ingredients." Proceedings of the Combustion Institute. vol. 31 (2007). pp. 2089-2096.
Chen et al. "Recent Development in Diamond Synthesis." International Journal of Modern Physics B. vol. 22, No. 4 (2008). pp. 309-326.
Lou et al. "Diamond Formation by Reduction of Carbon Dioxide at Low Temperatures." Journal of American Chemical Society. 125, 9302-9303, 2003.

* cited by examiner

Figure 1. Side view of detonation well with byproduct removal from bottom.

Figure 2: High Pressure Mixer

Pressure-Temperature phase diagram for $CO_2$.

Figure 4: Stability and Detonation Testing

EXPLOSIVE FORMULATIONS OF MIXTURE OF CARBON DIOXIDE AND A REDUCING AGENT AND METHODS OF USING SAME

REFERENCE TO RELATED APPLICATIONS

This application is a continuation-in-part of application Ser. No. 12/809,917, filed Jun. 21, 2010 which is a national phase application of PCT Patent Application No. PCT/CA2008/002198 filed Dec. 22, 2008 claiming priority from U.S. provisional application Ser. No. 61/008,632 filed Dec. 21, 2007.

FIELD OF DISCLOSURE

At least one embodiment of the present invention pertains to an explosive formulation comprising a detonable mixture of an oxidizing agent such as carbon dioxide, and a material that decomposes the oxidizing agent exothermically (a reducing agent), and additives that increase the mixture's shock sensitivity. The formulations may be used in a method to produce diamonds as described herein or in other applications that use traditional explosives such as, but not limited to: ammonium nitrate and fuel oil combinations (ANFO), watergel explosives, emulsion explosives, TNT and RDX.

DESCRIPTION OF THE PRIOR ART

According to the U.S. Geological Survey, Mineral Commodity Summaries, January 2008, the US consumption of industrial diamonds in 2007 was estimated to be over 600 million carats, valued at over $300 million. It indicates that synthetic diamond rather than natural diamond is used for about 90% of industrial applications and the main application is in the abrasives industry. Diamond material is fused to metal to produce specialty cutting tools.

When a high enough pressure packs carbon atoms together, diamond is formed. The traditional approach to creating industrial diamonds with explosives is based on using the pressure of a detonation to pack carbon atoms together. With this approach carbon is physically added to an explosive or a system containing explosives, the explosive is detonated, and the pressure of the blast converts the added carbon into diamond dust. Some approaches use blends of explosives that do not possess enough oxygen in the formulation to fully oxidize all of its carbon to $CO_2$. Such explosives are said to have a negative oxygen balance and therefore produce elemental carbon as a byproduct of detonation. A portion of the carbonaceous byproduct is compressed into nanodiamond from the heat and pressure of detonation. "Nanodiamonds" are small crystals ranging in size from 2-15 nm and lager agglomerates that are 50-200 nm in size. The material is used for polishing, lapping, abrasive applications, as a reinforcement additive to ceramics and polymers and as a chemotherapy drug carrier. This fine diamond material may also be used as an automotive oil additive to decrease fuel consumption and prolong engine life. Nanodiamond sells for $1,000 to $10,000 per kg depending on purity and particle size distribution.

An "explosive" is a detonable mixture of a fuel, typically consisting of carbon and hydrogen, and a nitrogen containing oxygen source. Waste products of a detonation are mainly carbon dioxide, water (steam), and various nitrogen gases NOx.

The term "oxygen balance" describes the ratio of oxygen to fuel in an explosive required to convert the ingredients to $CO_2$, $H_2O$ and other oxides. Insufficient oxygen in a formulation means there is not enough oxygen available to fully oxidize all of the fuel, or it is said to have a negative oxygen balance. Since the traditional approach to creating diamonds with explosives uses extra carbon, or insufficient oxygen, all conventional diamond synthesis explosive systems are considered negatively oxygen balanced.

Prior attempts have failed to solve the problem of reducing waste products and creating industrial diamond products from a positive oxygen balanced explosives approach. Known methods for the creation of industrial diamonds using explosives have been based on negative oxygen balances achieved by carbon-producing organic explosives or by adding carbon to an explosive and detonating the formulation.

U.S. Pat. No. 5,353,708 (Stavrev et al.) teaches a method of production of an ultra-dispersed diamond which can be used for the production of abrasive materials. While the method taught by Stavrev allows for the production of a diamond, it does not solve the problem of creating a positive oxygen balance because the organic explosive or explosives have a stoichiometrically negative oxygen balance.

U.S. Pat. No. 5,916,955 (Vereschagin et al.) teaches a method of producing a diamond-carbon material that contains carbon, nitrogen, oxygen and incombustible impurities of a composition and the surface contains methyl, carboxyl, lactone, aldehyde, ether, and quinone groups by detonating an oxygen-deficient explosive. While the method taught by Vereschagin allows for the creation of a diamond-carbon material, it does not solve the problem of creating a positive oxygen balance because the explosive has a negative oxygen balance.

U.S. Pat. No. 5,482,695 (Guschin et al.) teaches a method of producing super hard materials. While the method taught by Guschin allows for the production of materials containing diamond products, it does not solve the problem of using a positive oxygen balance because the explosion has a negative oxygen balance.

Furthermore, there are numerous synthetic diamond manufacturers around the world and their products include diamond pastes, suspensions and lubricants and more with many applications. What is desired is an affordable method of creating industrial diamonds which consumes the greenhouse gas carbon dioxide and can also be used to reduce the consumption of products such as gasoline, oil and lubricants, which would reduce production costs and further benefit the environment.

SUMMARY

This summary is provided to introduce in a simplified form certain concepts that are further described in the Detailed Description below. This summary is not intended to identify essential features of the claimed subject matter or to limit the scope of the claimed subject matter.

An explosive formulation is disclosed. The explosive formulation in one embodiment is a detonable mixture of carbon dioxide (CO2) and an effective amount of a reducing agent. The reducing agent may be selected from the group consisting of powdered metal, atomized metal, metal alloy or metal combination thereof capable of being oxidized by the CO2. The detonable mixture has a neutral or positive oxygen balance calculated without including the carbon in the carbon dioxide.

In other embodiments, other compounds are added to the detonable mixture to increase the mixture's shock sensitivity. Additives may include a sensitizer. Detonating the mixture produces elemental carbon as a by-product in various phases such as graphite, graphene, amorphous carbon or diamond.

The philosophy of oxygen balance is based on the understanding that a zero oxygen balanced explosive offers optimum energy because of the perfect balance of fuel to oxygen. In the case of the embodiments described, optimum energy output is achieved with roughly a stoichiometric ratio of carbon dioxide to reducing agent. Although a traditional oxygen balance calculation for the explosive's formulation would suggest a heavily negative one, the most energetic formulations of embodiments of the present invention should have an oxygen balance of zero.

Due to the present approach of basing an explosive formulation on a mixture of carbon dioxide and a reducing agent, and also considering the discrepancy of maximum energy output in relation to a traditionally zero oxygen balance, the carbon in the carbon dioxide, therefore, is not included in the calculation of oxygen balance for the explosive formulations described in the embodiments herein that use any ratio of carbon dioxide to reducing agent as a basis for liberating energy. Due to use of carbon dioxide as a non-traditional oxidizer, the oxygen balance would have to be calculated in the traditional manner with the exception that the carbon in the carbon dioxide is not included in that calculation.

The potential advantages of using the described explosive formulations include lower cost of ingredients and greater variability of explosive performance made possible through adjusting the ratio of $CO_2$ to reducing agent. Another potential advantage is the detonation byproduct may be comprised of 60% to 85% nano reducing agent oxides as well as 5% to 15% carbon.

Some nano oxide byproducts from the detonation of different embodiments of the explosive formulations have commercial value for example as an abrasive. Examples of such oxides are aluminum oxide, magnesium oxide and silicon dioxide. Different embodiments of the explosive formulations can therefore be employed as a method to produce detonation nano oxides.

While studying the effectiveness of different embodiments of the explosive formulations as a method to produce nano diamond, results have revealed the explosive is very powerful and capable of obliterating heavy gauge steel pipes and blasting huge craters from the ground. Different embodiments of the explosive formulations can therefore be employed as a substitute for conventional explosives in mining, quarry work, demolition and military applications.

Because the carbon dioxide used in some embodiments of the formulations described in the Detailed Description is in its solid state at atmospheric pressure, which also happens to exist at a temperature of −78.5° C. as dry ice, the field of study of said formulations has been named "Cold Detonation Physics", or CDP.

Further aspects will be described or will become apparent in the course of the following detailed description.

BRIEF DESCRIPTION OF THE DRAWINGS

One or more embodiments of the present invention are illustrated by way of example and not limitation, in the accompanying drawings.

Figure 1:
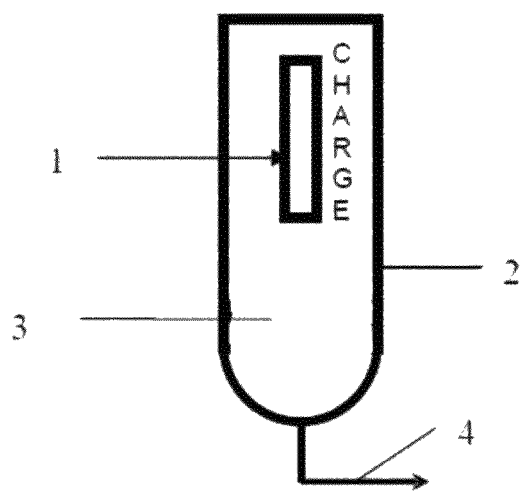
FIG. 1 shows a side view of a cylindrical detonation well, filled with water, with a charge hanging in accordance with one embodiment of a method described herein.

Similar references are used in different figures to denote similar components.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Embodiments of the present formulations are manufactured by combining $CO_2$ and reducing agents either with or without additional explosive sensitizer. In one series of embodiments finely powdered dry ice (frozen $CO_2$) are combined with powdered, atomized or flaked reducing agents, namely elemental aluminum, magnesium, boron or silicon and combinations thereof.

Explosive initiation causes the reducing agent to be oxidized by $CO_2$, which results in the formation of elemental carbon, the formation of a solid oxide, and the liberation of energy. Combustion of stoichiometric mixtures of embodiments described liberate approximately 7 to 10 kJ/g of mixture. In cases where hydrogen is available in the formulation, some carbonaceous byproduct may undergo a reaction during detonation to cause the production of gaseous hydrocarbons, namely methane and ethane.

The addition of excess $CO_2$ to the formulations increases pressure due to heating and expansion of excess $CO_2$ at the detonation wave front, which lowers the overall energy output. The blast performance of the explosive can therefore be tailored through the ratio of $CO_2$ to reducing agent and through the addition of an explosive sensitizer such as MMAN (monomethylamine nitrate) or RDX (1,3,5-Trinitroperhydro-1,3,5-triazine).

One embodiment described herein provides generally an explosives formulation and method for detonating it which may yield 5%-15% carbon by weight. The charges may be prepared, detonated underwater or within a sealed or venting chamber, and by-products collected. The resulting by-products material is comprised predominantly of an oxide of the reducing agent(s) used in the formulation and a carbon portion, which may include amorphous carbon, graphite, graphene, and diamond crystals ranging in, but not limited to, the 5-15 nm range. They are detonation by-products of explosive formulations that use carbon dioxide as the oxidizing agent and a fuel or reducing agent that decomposes the carbon dioxide exothermically.

In the detonation reaction, the reducing agent pulls the oxygen atoms from the carbon dioxide, leaving the carbon behind. The force of detonation compresses this carbon by-product into fine diamond of varying sizes as a function of the formulation composition, its density, diameter of charge, velocity of detonation, size of primer used for initiation, method of detonation including any electrical or alternative thermal means or techniques that transfer enough energy to initiate a detonation, the cooling rate of the by-products, the type of or level of chemical sensitizer added, oxygen balance, type of confinement, temperature of detonation, and external temperature and pressure at time of detonation.

Reducing agents suitable for use as fuel in the embodiments described are selected from the following group consisting of materials that are capable of being oxidized by the $CO_2$, such as powdered, flaked, atomized, alloys or combinations of elemental metals aluminum (Al), magnesium (Mg), lithium (Li), beryllium (Be), calcium (Ca), sodium (Na), titanium (Ti) and zirconium (Z); powdered, flaked, atomized or combinations of non-metal elemental boron (B) and silicon (Si); powdered metal hydrides lithium hydride (LiH), sodium hydride (NaH), beryllium hydride ($BeH_2$), magnesium hydride ($MgH_2$), calcium hydride ($CaH_2$), aluminum hydride ($AlH_3$), lithium aluminum hydride ($LiAlH_4$), sodium aluminum hydride ($NaAlH_4$), magnesium alanate ($Mg(AlH_4)_2$) and calcium alanate ($Ca(AlH_4)_2$); liquid, supercritical or gaseous forms of diborane ($B_2H_6$) or silane ($SiH_4$) and any combination of any of these materials. Combinations of the materials includes any one reducing agent selected from the list in any of its physical states together with any combination of any of the other reducing agents in any of their physical states. For example, an atomized aluminum/magnesium alloy can be mixed with powdered silicon. Reducing agents with high purity (greater than 98% pure) solid elemental reducing agents or combinations thereof have shown to be practical. All of the hydrides listed are functional reducing agents, however, their higher cost, toxicity and reactivity with air and water may render them less practical for commercial use. At atmospheric pressure most of the reducing agents listed exist in the solid state. Gaseous reducing agents may be used in their liquid, supercritical or gaseous states. The terms "fuel" and "reducing agent" are interchangeable.

Some embodiments of the present invention may use a bulking agent, such as perlite, to control density, as well as a chemical sensitizer, such as RDX, to affect the formulation's rate of reaction, explosive performance and sensitivity to shock. The explosive formulations may also include agents that affect overall viscosity of liquid carbon dioxide for the purpose of assuring even distribution of solid ingredients in the mixing phase.

As noted one embodiment relates to explosive formulations that employ carbon dioxide as the oxygen source, the process of preparing and detonating the charges and the generation of diamonds through that process. The formulations are prepared with at least the exact amount of carbon dioxide needed to match the oxygen demand of the fuel or reducing agent, which means that the formulations of the present invention work with a positive to neutral oxygen balance. Making diamond with a negatively oxygen-balanced formulation containing more reducing agent than what is stoichiometrically required can also produce diamond. Such an approach may be viewed as a stoichiometric mixture with excess material that does not contribute to any chemical reaction or detonation. The function of excess reducing agent or a different additive altogether serves the role of dissipating post-detonation heat.

By detonating the explosive formulation in an environment that protects the carbon by-products from subsequent chemical decomposition, such as a detonation chamber filled with oxygen-free water, a wide range of diamond-bearing material emerges with a high degree of homogeneity. The environment may be helium, argon, neon, krypton gas, carbon dioxide, water or oxygen-free water. Employing water as the inert medium is advantageous as it functions both as a shock absorber and a cooling agent which cools the by-products at a rate that optimizes their physical characteristics. The formulations or systems that detonate or respond to the detonation of said formulations, may also contain diamond powder, nickel or any other material that improves the resulting diamond bearing material's ability to be bonded to other materials such as steel to make cutting tools. Note that diamond will emerge from a detonation even if the detonation environment is not inert to the carbon by-product such as air or oxygen. After purifying the byproduct with standard techniques such as strong acids, rinsing, and then heating in air, the resulting carbonaceous material can be analyzed for carbon phase and particle size.

Irrespective of whether the detonation by-products of the present invention are cooled quickly or slowly (at rates of 7000 degrees per minute versus 200 degrees per minute respectively), diamond and graphene should result from the detonation process.

The diamond bearing material produced has a density range of about 2.0 to 3.3 $g/cm^3$. The surface chemistry of the diamond bearing material produced will display varying degrees of hygroscopic behaviour in relation to the amount of organic alkyl functional groups that form on particle surfaces during and after detonation. A predominant methyl functional group, for example, gives the material a water-repellent property.

The surface of diamond bearing materials display varying weight percentages of amorphous carbon, graphite and graphene. The diamond-bearing material has a wide particle size distribution larger than and not limited to nano particles in the 4 to 15 nanometer range. The diamond bearing material will be comprised to some extent of integrated diamond and non-diamond particles and polycrystalline diamond.

One embodiment of the method for producing the diamond bearing material consists of the following steps:

a. Prepare a charge by blending carbon dioxide, fuel, and optionally a sensitizer and fill a cylindrically shaped container such as a metal pipe or cardboard tube with that mixture.

Figure 2:
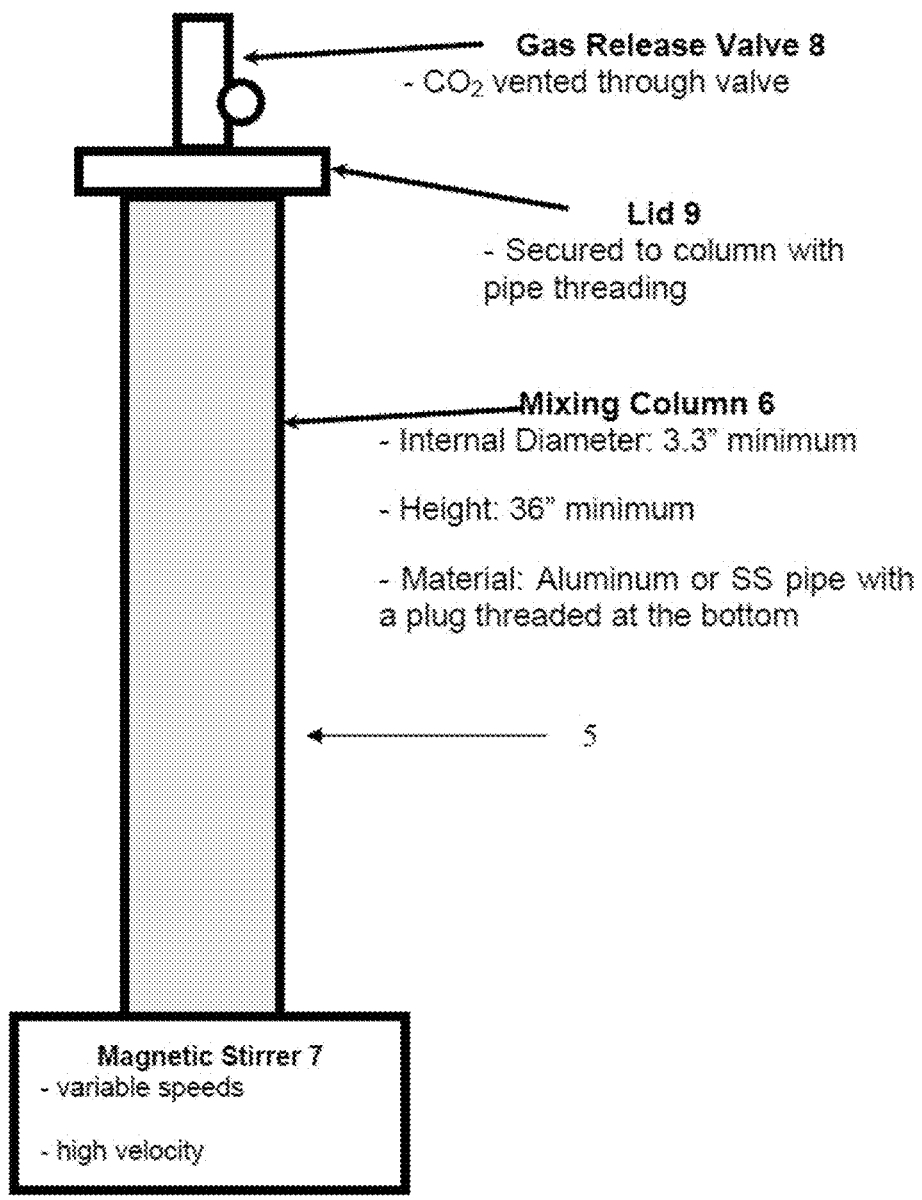
FIG. 2 is a side view of a high pressure mixer employed to mix liquid carbon dioxide with powdered reducing agent in accordance with one embodiment described herein.

Mixing can be facilitated as follows:

i) at atmospheric pressure by physically blending powdered or crushed carbon dioxide (dry ice) with other ingredients, or, ii) at atmospheric pressure by depressurizing liquid carbon dioxide and mixing with other ingredients, or, iii) under high pressure where ingredients are added to carbon dioxide in its solid, supercritical or liquid state. The slurry of high pressure liquid carbon dioxide and other ingredients are depressurized to atmospheric pressure in a high pressure mixer (see FIG. 2), which causes the formulation to harden with all ingredients evenly dispersed. Controlling the rate of depressurization can be used to manipulate final charge density.

b. The charge is detonated in an environment containing a medium that is inert to carbon and cools the detonation by-products.

c. Detonation by-products containing carbon are extracted and then may be separated according to particle size and phase (diamond versus graphite, graphene or amorphous and combinations thereof) either as part of the process or separately.

The by-product may consist mainly of the reducing agent oxide in the form of agglomerated nanoparticles. The oxide may be extracted from the by-product by burning off all the carbon with oxygen. Carbon may be removed by heating the raw byproduct to a temperature of 1000 degrees Celsius and passing air, oxygen or ozone through the byproduct until all of the carbon and diamond combust and become $CO_2$, which can be vented. Alternatively, chemical oxidizing agents such as hydrogen peroxide or ammonium nitrate may be employed with heat to remove the carbon without adding any contaminants to the oxide byproduct.

Here is a table of reducing agent nano oxides formed from each respective reducing agent previously listed:

| Reducing Agent | Nano Oxide |
| --- | --- |
| Aluminum and/or Aluminum Hydride | Aluminum Oxide ($Al_2O_3$) |
| Magnesium and/or Magnesium Hydride | Magnesium Oxide (MgO) |
| Lithium and/or Lithium hydride | Lithium Oxide ($Li_2O$) |
| Beryllium and/or Beryllium Hydride | Beryllium Oxide (BeO) |
| Boron and/or Diborane gas | Boron Oxide ($B_2O$) |
| Silicon and/or Silane gas | Silicon Dioxide ($SiO_2$) |
| Calcium and/or Calcium Hydride | Calcium Oxide (CaO) |
| Sodium and/or Sodium Hydride | Sodium Oxide ($Na_2O$) |
| Titanium | Titanium Dioxide ($TiO_2$) |
| Zirconium | Zirconium Dioxide ($ZO_2$) |
| Lithium Aluminum Hydride | Lithium Oxide and Aluminum Oxide |
| Sodium Aluminum Hydride | Sodium Oxide and Aluminum Oxide |
| Magnesium Alanate | Magnesium Oxide and Aluminum Oxide |
| Calcium Alanate | Calcium Oxide and Aluminum Oxide |

The core reaction that occurs during the detonation of CDP formulation is:

$$CO_2 + RA(\text{Reducing Agent}) \rightarrow RA_{oxide} + C + \text{Energy}$$

In cases where hydrogen-containing reducing agents are used, the general reaction is:

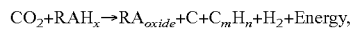

$$CO_2 + RAH_x \rightarrow RA_{oxide} + C + C_mH_n + H_2 + \text{Energy},$$

where $C_mH_n$ is typically a mix of hydrocarbons such as $CH_4$ and $C_2H_6$. The distribution of hydrocarbons is a function of detonation pressure and ratio of $CO_2$ to hydrogen-containing reducing agent ($RAH_x$).

Here are some examples of stoichiometric combinations for some embodiments:

1. Magnesium: $2Mg + CO_2 \rightarrow 2MgO + C + 8.75$ kJ/g mixture
2. Aluminum: $(4/3)Al + CO_2 \rightarrow (2/3)Al_2O_3 + C + 9.05$ kJ/g mixture
3. Boron: $(4/3)B + CO_2 \rightarrow (2/3)B_2O_3 + C + 10.3$ kJ/g mixture
4. Silicon: $Si + CO_2 \rightarrow SiO_2 + C + 7.17$ kJ/g mixture The above stoichiometric formulations do not produce enough pressure to employ CDP as a conventional explosive. Making effective use of CDP for explosive applications requires more $CO_2$ than what is stoichiometrically required to fully consume the reducing agent. Excess $CO_2$ is pressurized from heat released during detonation. Here is a general range of formulations based on the above preferred reactions:

| Reducing Agent | $CO_2$ | Sensitizer | Energy(kJ/g) |
| --- | --- | --- | --- |
| 5%-60% | 25%-85% | 0%-70% | 3.5-7.0 |

In a traditional explosive, carbon and hydrogen fuel are rapidly oxidized into $CO_2$ and steam with the release of energy. The release of energy heats and pressurizes the gaseous byproducts. Oxygen plus carbon and hydrogen fuel may be contained in one chemical molecule, as in the cases of TNT and RDX, or through the combination of an oxygen source with a fuel, as in the cases of ANFO and emulsion explosives. In the case of ANFO for example, ammonium nitrate fertilizer (AN) is a nitrogen-containing chemical oxygen source and the hydrogen and carbon fuel source is fuel oil (FO).

Figure 9:
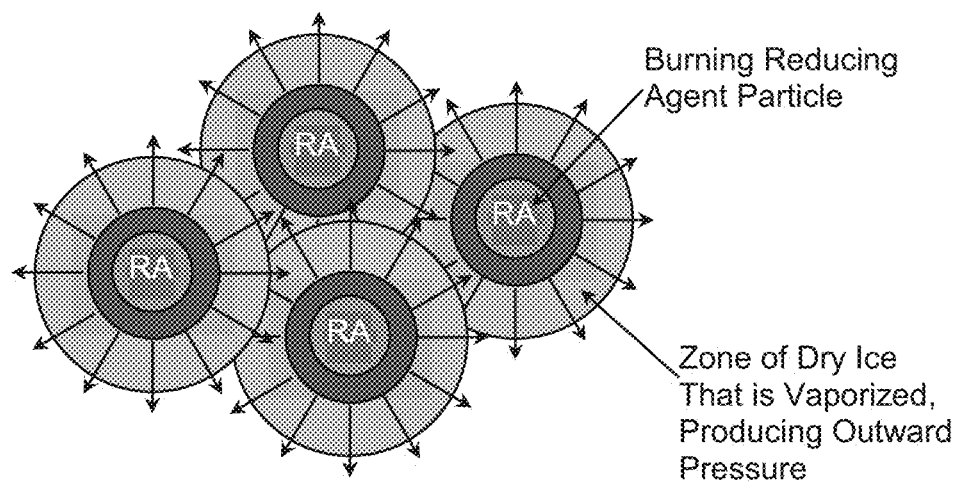
FIG. 9 is a schematic illustration of an embodiment of a mixture according to one embodiment described herein.

In embodiments disclosed, reducing agent particles are rapidly oxidized by $CO_2$, which produces high temperature and subsequently heats and pressurizes excess $CO_2$ in the vicinity of a burning particle with surface temperatures of 3000° to 4000° C. (see FIG. 9). Unlike other explosives, the method of heating and pressurizing $CO_2$ in the vicinity of a high temperature event is a factor of the detonation mechanics of the embodiments described.

Many of the explosive formulations as described offer more energy per gram of formulation than traditional explosives such as nitro-glycerine and TNT. The ability to detonate the explosive formulations depends upon whether the rate of energy released is fast enough to sustain a stable detonation. Reaction rate is heavily influenced by charge diameter, amount of initiation (size of primer or booster), charge confinement (for example the thickness of the pipe containing the formulation), density, temperature and chemical sensitivity. The addition of a sensitizer, such as an explosive like RDX, increases the rate of reaction and explosive initiation sensitivity. The addition of bulking agents, such as perlite or glass microballoons, may be used to control density. The described explosive formulations may also include ingredients that affect the viscosity of liquid carbon dioxide or affect its ability to fully dissolve or emulsify other ingredients.

In another embodiment described small particles of reducing agent are dispersed as evenly as possible in a continuous phase of $CO_2$. The preferred state of the $CO_2$ is solid and at atmospheric pressure, which is more commonly known as 'dry ice.'

Here is a table of formulations that employ different embodiments of mixtures of $CO_2$ with elemental magnesium:

TABLE 1

| Mg | $CO_2$ | Sensitizer (RDX) | Energy kJ/g |
| --- | --- | --- | --- |
| 25% | 75% | 0% | 3.9 |
| 30% | 70% | 0% | 4.8 |
| 20% | 70% | 10% | 3.6 |
| 30% | 60% | 10% | 5.3 |
| 25% | 60% | 15% | 4.7 |
| 25% | 55% | 20% | 5 |
| 30% | 50% | 20% | 5.9 |
| 25% | 50% | 25% | 5.3 |

Here is a table of formulations that employ different embodiments of mixtures of $CO_2$ with elemental aluminum:

TABLE 2

| Al | $CO_2$ | Sensitizer (RDX) | Energy kJ/g |
|---|---|---|---|
| 25% | 75% | 0% | 4.8 |
| 30% | 70% | 0% | 5.8 |
| 20% | 70% | 10% | 4.3 |
| 30% | 60% | 10% | 6.4 |
| 25% | 60% | 15% | 5.6 |
| 25% | 55% | 20% | 5.9 |
| 30% | 50% | 20% | 7 |
| 25% | 50% | 25% | 6.2 |

Boron mixtures produce the highest energy per gram of stoichiometric mixture out of the described embodiments. Table 3 lists some formulations using boron:

TABLE 3

| B | $CO_2$ | Sensitizer (RDX) | Energy kJ/g |
|---|---|---|---|
| 15% | 85% | 0% | 6 |
| 20% | 80% | 0% | 7 |
| 15% | 75% | 10% | 5.7 |
| 20% | 70% | 10% | 7.6 |
| 20% | 65% | 15% | 7.8 |
| 10% | 75% | 15% | 4.1 |
| 10% | 70% | 20% | 4.4 |
| 10% | 65% | 25% | 4.6 |

Note that formulations with energies above 5.21 kJ/g possess more energy per gram than the high explosive RDX. Silicon formulations possess the least amount of energy per gram of stoichiometric mixture. Here are some silicon formulations:

TABLE 4

| Si | $CO_2$ | Sensitizer (RDX) | Energy kJ/g |
|---|---|---|---|
| 25% | 75% | 0% | 4.3 |
| 30% | 70% | 0% | 5.2 |
| 25% | 65% | 10% | 4.8 |
| 25% | 60% | 15% | 5.1 |
| 25% | 55% | 20% | 5.4 |
| 20% | 60% | 20% | 4.5 |
| 20% | 65% | 15% | 4.2 |
| 20% | 55% | 25% | 4.7 |

Excluding any possible side reactions with hydrogen and carbon, an embodiment of the explosive formulation with hydrogen containing reducing agent, lithium aluminum hydride, follows this reaction:

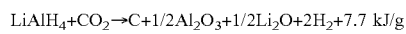

$LiAlH_4 + CO_2 \rightarrow C + 1/2 Al_2O_3 + 1/2 Li_2O + 2H_2 + 7.7$ kJ/g

Because the energy per gram of stoichiometrically balanced $LiAlH_4$ and $CO_2$ is only marginally higher than the reaction between $CO_2$ and silicon, the energy values in Table 4 are a close approximation for his hydride reducing agent.

The energy per gram of the described explosive mixtures can be adjusted to suit any application requiring tight energy output tolerances. Also, the mixtures of certain embodiments are detonable with densities that range from, but are not limited to, 1 g/cm3 to about 1.6 g/cm3. The range of detonable densities and energy per gram, render explosive formulations as described an ideal explosive for use in applications where both physical volume and energy constraints are important.

Note that certain of the embodiments described may use the term "sensitizer" and, suitable sensitizers include MMAN (monometyhylamine nitrate) and RDX (cyclotrimethylenetrinitramine) as examples. Other explosives such as PETN (pentaerythritol tetranitrate) or HMX (octahydro-1, 3,5,7-tetranitro-1,3,5,7-tetrazocine) are other samples of sensitizers that can be used to increase the shock sensitivity of explosive formulations described herein. Sensitizers may also be comprised of an active ingredient, such as RDX, and an organic binder up to 25%.

Some of the described embodiments use granular sensitizer of a mesh size ranging from −10 mesh down to 60 mesh. Note that larger or smaller particles of sensitizer can also be utilized.

Reaction rate is driven by the speed of reducing agent burn time. There are two embodiments for increasing reducing agent burn time:
1. Smaller Particle Size or Larger Surface Area Per Gram: Some of the embodiments use reducing agent particles that are smaller than 100 mesh and in some cases −400 mesh powder. When comparing similar particle sizes, mechanically ground reducing agent has a surface area per gram that is higher than atomized reducing agent. The ratio of surface area per gram of reducing agent is inversely proportional to the average particle diameter.
2. Particles mixed with sensitizer and a binder: Reducing agent may be prepared by mixing sensitizer with an organic binder and the reducing agent. The mixture may then be crumbled and sifted through a larger screen such as a #5 or #10 mesh (the material that passes through the sieve is used in the formulation). Smaller particles of the sensitizer/reducing agent composite may perform better as noted above.

One embodiment in the area of charge preparation is to mix ingredients under high pressure. A suggested prototype illustrated in FIG. 2 can be used both for mixing and setting density.

Charges may be prepared by adding solid ingredients to a dry ice cooled high pressure mixer 5, capping it, pumping high pressure liquid $CO_2$ into the vessel 6, and then stirring the contents with a magnetic stirrer 7. Once the material has been adequately mixed, a valve 8 is opened to reduce the pressure in the mixer to atmospheric, which causes the slurry to solidify and suspend the ingredients homogeneously. Organic sensitizers are soluble in liquid $CO_2$ and can therefore be dissolved and evenly distributed in a high pressure mixer.

Once the mix has completely solidified, the lid 9 can be opened safely and the charge 1 removed as one solid piece. Inserting a cardboard tube prior to mixing assists in the easy removal of a freshly prepared charge which can then be detonated as-is or inserted into a metal pipe of the desired confinement. Controlling the rate of depressurization may be used to set final charge density.

Figure 3:
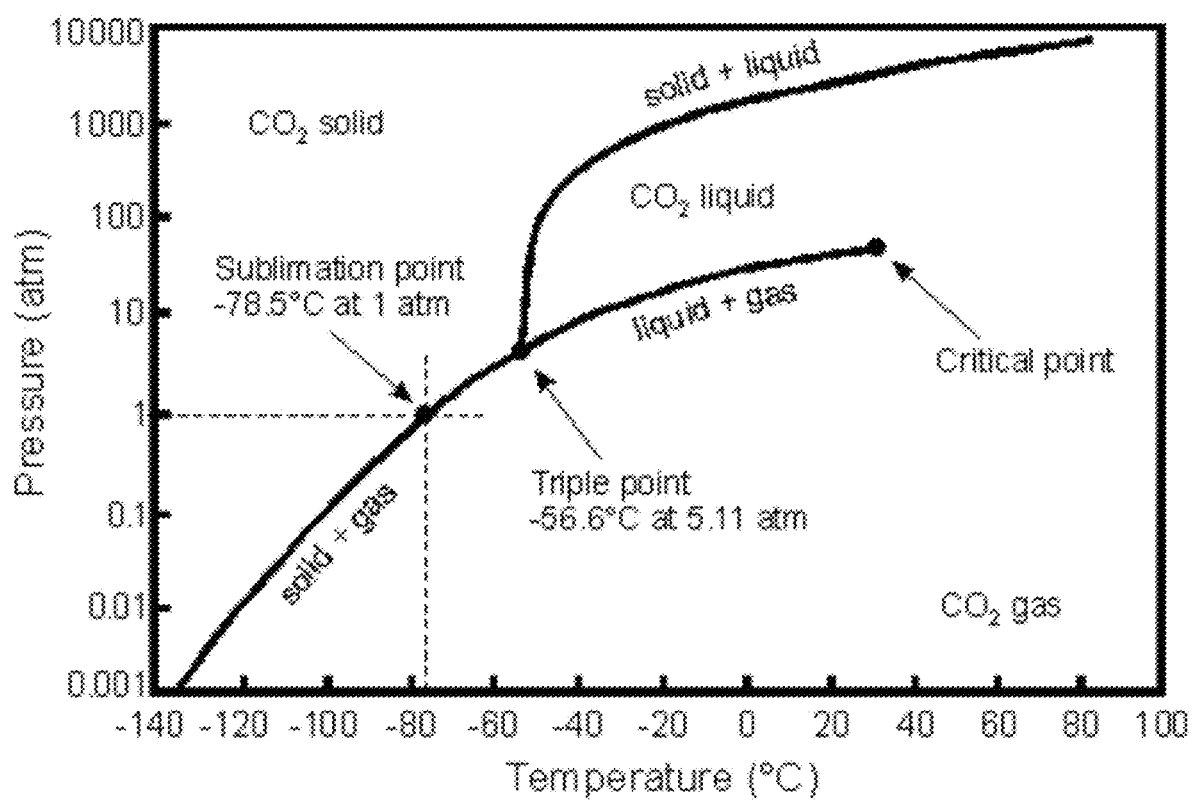
FIG. 3 is a phase diagram illustrating the combinations of temperature and pressure for various states of carbon dioxide (solid, liquid and gas).
Figure 4:
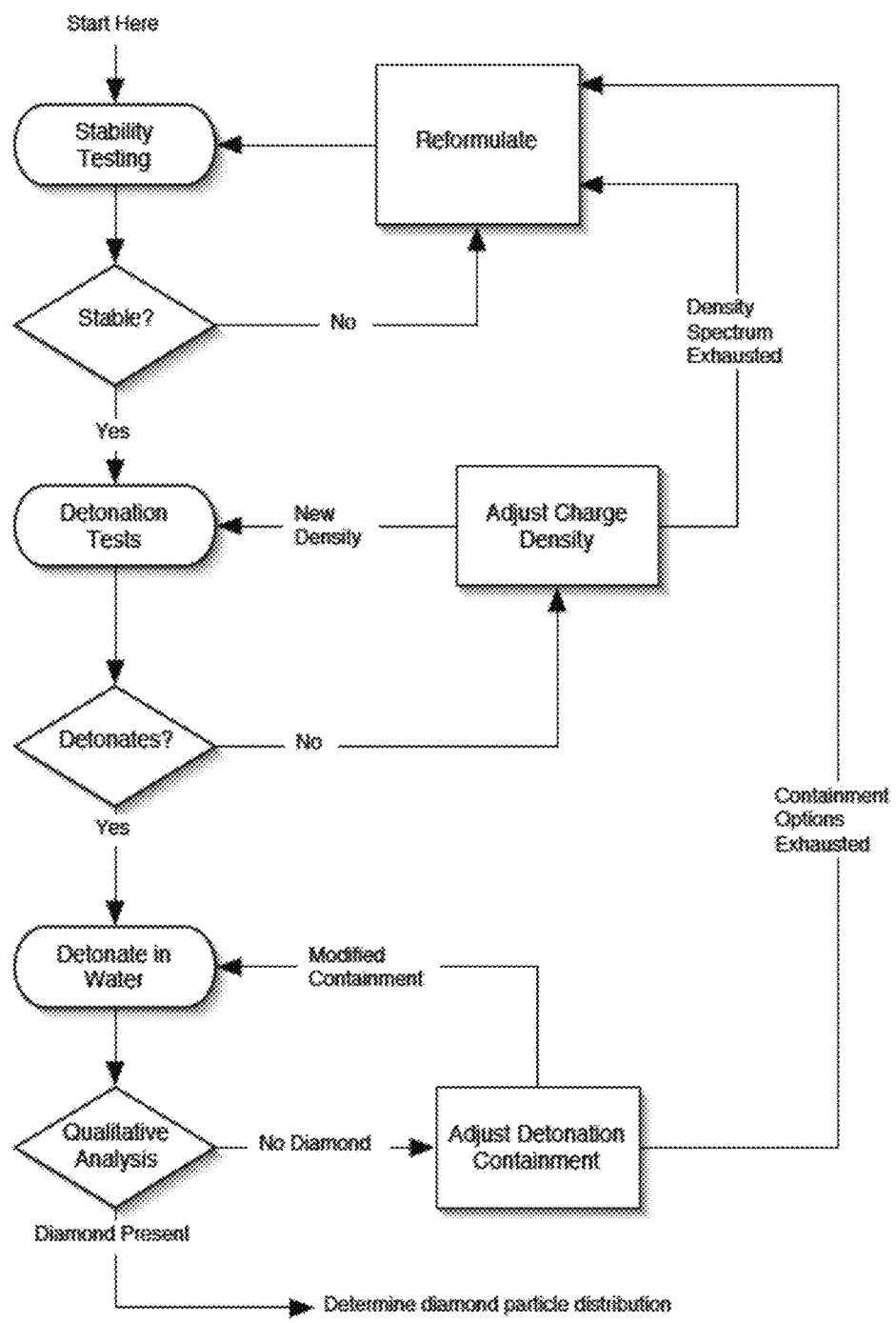
FIG. 4 is a flowchart illustrating the stability and detonation testing of one embodiment described herein
Figure 5:
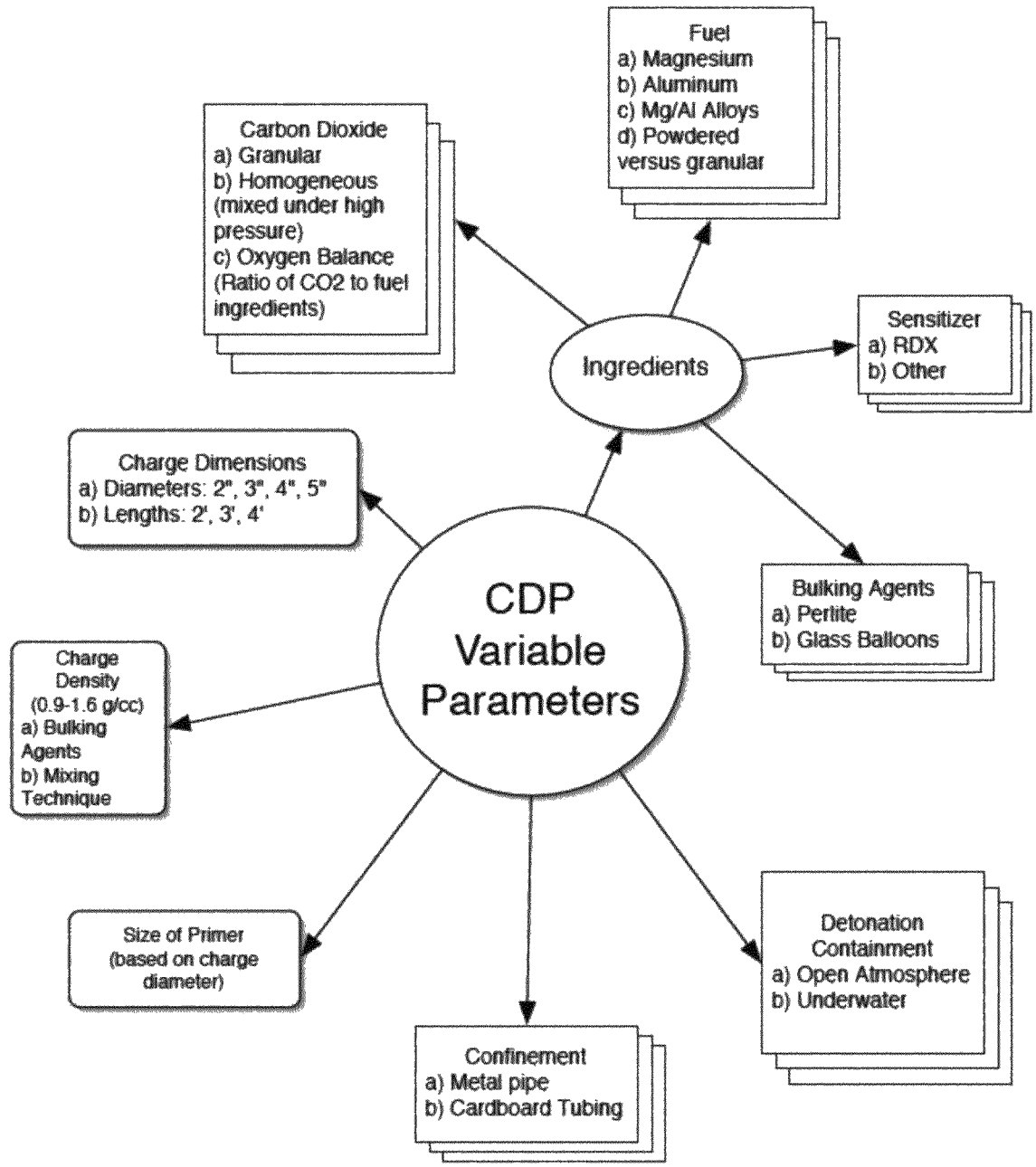
FIG. 5 is a diagram illustrating variable parameters available in methods described herein.

The objective of the mixer is to create an environment where $CO_2$ is in its liquid state so that ingredients can be blended successfully. The temperature phase diagram seen in FIG. 3 assists in determining the combinations of temperature and pressure that liquefy $CO_2$.

Figure 6:
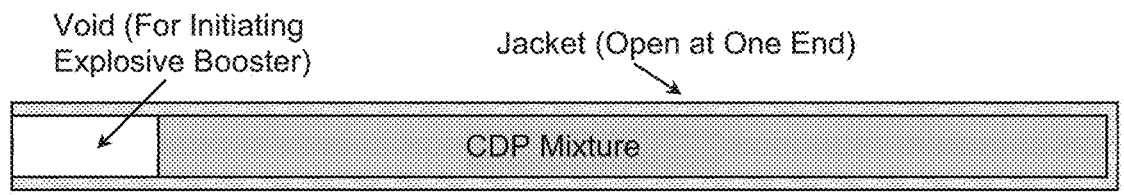
FIG. 6 shows an example of a containment jacket for a solid explosive formulation.
Figure 7:
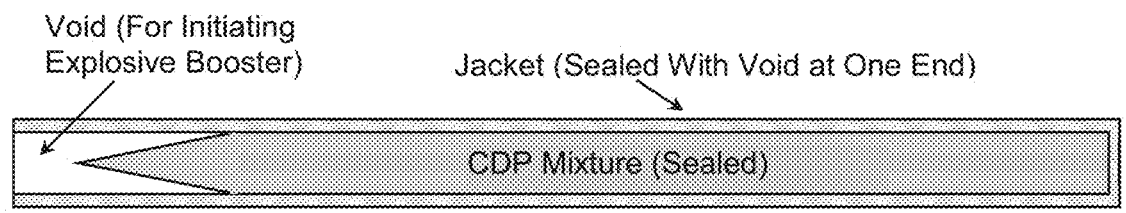
FIG. 7 shows an example of a sealed containment jacket for either solid, liquid or gaseous explosive formulation under pressure.
Figure 8:
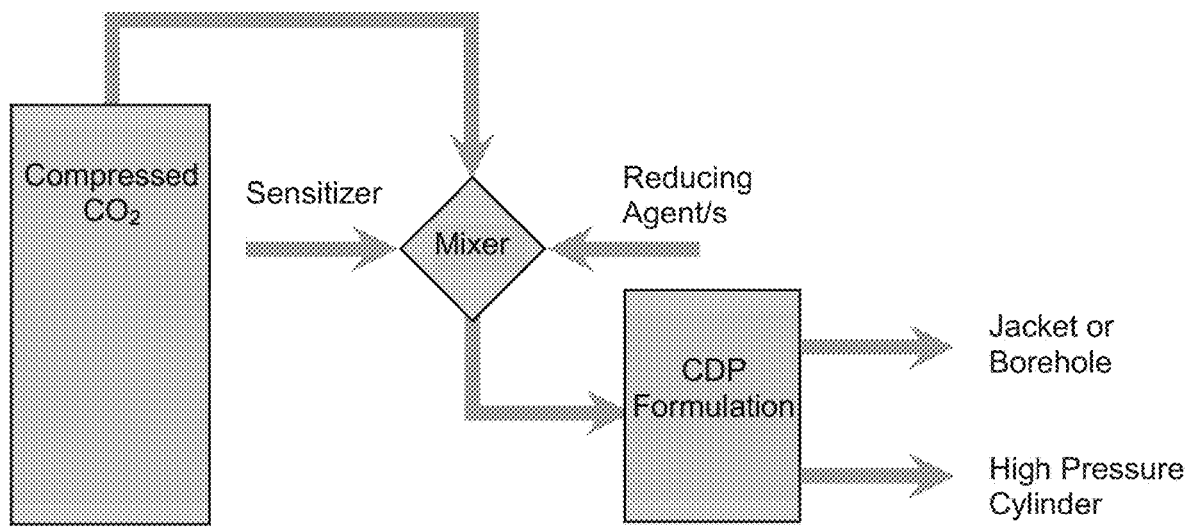
FIG. 8 shows a general process layout for preparing explosive formulations according to an embodiment described herein.

FIG. 8 shows a general process layout for preparing embodiments of the explosive formulations described. Compressed $CO_2$ may be fed as a liquid to a high pressure mixer or depressurized to atmospheric pressure prior to mixing at atmospheric pressure. The latter method causes the formation of finely powdered dry ice. Either way, $CO_2$ is mixed with reducing agent/s, and sensitizer, if any, to make an explosive formulation. The prepared formulation is then used to fill jackets (see FIG. 6), cartridges or boreholes at atmospheric pressure or pumped into sealed high pressure jackets as depicted in FIG. 7. FIG. 6 shows an example of a containment jacket for solid CDP formulation. The jacket is a cylindrical tube made of either cardboard, plastic or metal. FIG. 7 shows an example of a sealed containment jacket for either solid, liquid or gaseous CDP formulation under pressure that is greater than 1 atmosphere. Such a jacket may also employ a release valve, which sets the pressure to a fixed maximum to ensure the jacket does not rupture prior to detonation and maintains a desired internal temperature. For example, a 300 psi release valve would create conditions such that $CO_2$ exists as a liquid at a temperature of about zero degrees Fahrenheit. The open end of the jacket depicted in FIG. 7 shows a conical void, which focuses an amplified shock wave to the formulation when the cone is surrounded by initiating explosives. Other containment geometries such as spherical or conical shaped charges are valid methods to employ the explosive formulations for explosive use. A thermal insulating barrier may be used to reduce heat transfer between the container and the mixture.

The explosive performance of some embodiments of the explosive formulations has been explored with steel pipes having an internal diameter of 1", 2" and 3". One magnesium formulation (75% $CO_2$+25% Mg) was shown to be detonable with a #8 electric blasting cap. Detonating the formulation in steel pipes results in the total obliteration of the pipe. Detonating a 2 kg×3" diameter buried magnesium charge creates a crater measuring about 2 m diameter by about 2 m deep in dense clay terrain.

A good rule of thumb in determining length of charge required for a proper detonation is 8 times the diameter (Dr. Katsabanis—"Explosives Technology"). So, for an inner diameter of 3", the charge length should be at least 8×3"=24" or 2 feet. Using 4" EH pipe, which has an inner diameter of 3.3", charge lengths will be at least 2.5 feet. The heavy confinement offered by extra heavy gauge pipe lowers the diameter required to sustain a detonation when compared with alternative packaging such as lighter gauges of pipe or cardboard tubing.

A pipe filled with the explosive formulations described herein will be referred to as a CDP charge. One embodiment of a means to detonate a CDP charge is to equip the charge with an appropriately sized booster and a detonator. The objective with a CDP charge is to impart upon it a strong enough shock wave to initiate detonation, and maximum impact is delivered by a large enough booster whose diameter closely matches that of the charge. Some formulations are "cap sensitive" meaning they may be initiated with a simple electric detonator or blasting cap.

Detonation of a CDP charge may also be initiated by other means such as electric discharge through any part of the charge, thermal ignition, firing a projectile at it, subjecting it to high pressure from a hydraulic press for example, or the use of additional explosive added either to the formulation or used in conjunction with the detonation procedure, as in lining the pipe's inner wall with explosive or by surrounding an explosive with CDP formulation.

In the case of using additional explosive, CDP formulations would employ an explosive with a neutral to negative oxygen balance and the overall oxygen balance would be calculated using all ingredients expect for the carbon in the carbon dioxide ingredient. The oxygen balance of the formulation is not affected by the oxygen balance of additional explosive used.

Determining the pressure of detonation of CDP charges requires the measurement of VOD ("velocity of detonation"). Determining and logging VOD per test provides data that can be used to determine the effect of charge preparation and detonation technique on explosive performance and by-product composition.

A portable device, such as the HandiTrap II Continuous Explosives VOD Recorder from MREL (see www.mrel.com) can be used with a Windows based computer to measure and record this information. A probe is inserted into the pipe of a CDP charge prior to filling and the probe is consumed in the detonation. Another method to measure VOD is to insert an optical cable into the formulation and connect the cable to an oscilloscope. Light is created at the wavefront during detonation and the cable responds by sending a signal to the oscilloscope, which accurately determines VOD.

One embodiment described herein requires a detonation well to collect by-product (see FIG. 1). With this approach, CDP charges, generally indicated at 1, in a detonation vessel will be subtended in the centre of a cylindrical well 2 filled with water 3 and then detonated. By-products 4 will sink to the bottom of the well where they will be collected by flushing and filtering some of the water. A flocculant, such as a water-soluble anionic polymer, may be employed to assist with precipitation of by-product. Bubbling air in the well during detonation assists with shock wave dissipation. Samples can be analysed with typical analytical equipment such as Small Angle Scattering, HR-TEM, $^{13}$C-NMR, XRD and RAMAN spectroscopy.

Embodiments of the explosive formulations described can be used for applications other than creating industrial diamond material. For example, embodiments of explosive formulations described herein may find use in the coal mining industry as a "permissible explosive" or in other mining applications as a replacement for traditional mining explosives. One embodiment of a method to employ embodiments of the explosive formulations for mining applications would be to prepare charges for immediate use or to pump or blow the explosive formulation directly into bore holes. A benefit to using CDP in mining is that the explosive does not produce any NOx gases, which are typically produced in great quantities from all conventional mining explosives because they all use nitrogen-containing chemical sources of oxygen such as ammonium nitrate or nitrated hydrocarbons.

CDP Testing

All charges may be tested with the following approach:
a) 4" by 2.5 foot EH pipe; formulation unsensitized;
b) Test at mix density (about 1.5 g/cm$^3$) and at the following densities: 1.25 g/cm$^3$ and 1.0 g/cm$^3$;
c) based on VOD measurements, test the most energetically responsive densities with varying levels of RDX if required, starting at 10% and increasing in increments of 5%;
d) determine VOD as a function of percentage sensitizer; and
e) determine carbon phases and size distribution as a function of percentage sensitizer.

Samples are prepared, detonated, and their VODs measured. The first tests are conducted with 4" EH pipe×2.5", which has an internal diameter of 3.3". Initial results reveal explosive performance across a spectrum of explosive formulations that do not include sensitizer. VOD results offer ongoing guidance as tests are completed and indicate how to best proceed.

Charge density may be manipulated by controlling the rate of solidification and rate of mixing in a high pressure mixer. If tests reveal that greater density control is required, then an appropriate bulking agent like perlite or glass microballons may be added to the formulation to reduce density. One disadvantage of adding a bulking agent is the proportionate decrease in energy per gram of formulation, which could subsequently lower VOD and detonation pressure. Alternatively, density may be adjusted by using a manual or hydraulic press.

If results indicate a need to increase rate of reaction, tests can be repeated with alternative reducing agents, larger diameter pipe, and with higher percentages of RDX or a different sensitizer altogether. The explosive RDX offers a desirable level of energy per gram and becomes more sensitive at lower temperatures, which makes it an appealing sensitizer candidate. Due to the organic solvent-like nature of liquid $CO_2$, carbon based sensitizers such as RDX should be soluble under pressure. Complete solubility of sensitizer enhances overall sensitivity of CDP charges because of greater contact between ingredients.

Advantages of different embodiments of the explosive formulations for explosive applications are ease of preparation, low manufacturing cost, customizable performance and environmental benefits. One potential environmental benefit to different embodiments of the explosive formulations is that the solid detonation byproducts are environmentally friendly. Unsensitized embodiments of the explosive formulations do not produce environmentally damaging NOx gases as other traditional explosives do. Also, the adverse environmental impact of manufacturing traditional explosives is far greater than the impact of manufacturing the ingredients for the current invention especially in the case of TNT and RDX, which are organic compounds. The production of organic explosives results in the creation of undesirable toxic organic byproducts that must be disposed of.

While the principles of the invention have been shown and described in connection with specific embodiments, it is to be understood that such embodiments are by way of example and are not limiting. Other modifications and applications, or equivalents, will occur to those skilled in the art. The terms "having", "comprising" and "including" and similar terms as used in the foregoing specification are used in the sense of "optional" or "may include" and not as "required". Many changes, modifications, variations and other uses and applications of the present construction will, however, become apparent to those skilled in the art after considering the specification and attached drawings. All such changes, modifications, variations and other uses and applications which do not depart from the spirit and scope of the invention are deemed to be covered by the invention which is limited only by the claims that follow. The scope of the disclosure is not intended to be limited to the embodiments shown herein, but is to be accorded the full scope consistent with the claims, wherein reference to an element in the singular is not intended to mean "one and only one" unless specifically so stated, but rather one or more. All structural and functional equivalents to the elements of the embodiment described throughout the disclosure that are known or later come to be known to those of ordinary skill in the art are expressly incorporated herein by reference and intended to be encompassed by the claims.

The invention claimed is:

1. A detonable mixture suitable for blasting comprising between about 60% to about 80% weight per weight carbon dioxide (CO2) in the solid state and at least one reducing agent selected from the group consisting of powdered, flaked, atomized, alloys or combinations of elemental metals aluminum (Al), magnesium (Mg), lithium (Li), beryllium (Be), calcium (Ca), sodium (Na), titanium (Ti) and zirconium (Zr); powdered, flaked, atomized or combinations of non-metal elemental boron (B) and silicon (Si); powdered metal hydrides lithium hydride (LiH), sodium hydride (NaH), beryllium hydride ($BeH_2$), magnesium hydride ($MgH_2$), calcium hydride ($CaH_2$), aluminum hydride ($AlH_3$), lithium aluminum hydride ($LiAlH_4$), sodium aluminum hydride ($NaAlH_4$), magnesium alanate ($Mg(AlH_4)_2$) and calcium alanate ($Ca(AlH_4)_2$); liquid, supercritical or gaseous forms of diborane ($B_2H_6$) or silane ($SiH_4$) or any combinations of any of the listed reducing agents.

2. The detonable mixture of claim 1 wherein the mixture is dry ice blended with the reducing agent at temperatures and pressures that permit the solid state of CO2.

3. The detonable mixture of claim 1 wherein the reducing agent is elemental magnesium.

4. The detonable mixture of claim 1 wherein the reducing agent is elemental aluminum.

5. The detonable mixture of claim 1 wherein the reducing agent is elemental silicon and one or more of the reducing agents of claim 1, excluding silicon.

6. The detonable mixture of claim 1 wherein the reducing agent is elemental boron.

7. The detonable mixture of claim 1 wherein the reducing agent is lithium aluminum hydride.

8. The detonable mixture of claim 1 wherein the mixture contains an additive in the form of a sensitizer to increase the mixture's shock sensitivity and rate of reaction on detonation.

9. The detonable mixture of claim 8 wherein the mixture is blended with about 1% to about 35% sensitizer on a weight percentage basis.

10. The detonable mixture of claim 9 wherein the mixture contains about 10% to about 30% reducing agent and is blended with about 1% to about 30% sensitizer on a weight percentage basis.

11. The detonable mixture of claim 8 wherein the additive is selected from the group consisting of MMAN, RDX, PETN or HMX.

12. The detonable mixture of claim 1 wherein the reducing agent is a combination of two or more of aluminum (Al), magnesium (Mg), lithium (Li), beryllium (Be), boron (B), silicon (Si), calcium (Ca), sodium (Na), titanium (Ti), zirconium (Zr), lithium hydride (LiH), sodium hydride (NaH), beryllium hydride ($BeH_2$), diborane ($B_2H_6$), magnesium hydride ($MgH_2$), calcium hydride ($CaH_2$), aluminum hydride ($AlH_3$), silane ($SiH_4$), lithium aluminum hydride ($LiAlH_4$), sodium aluminum hydride ($NaAlH_4$), magnesium alanate ($Mg(AlH_4)_2$), and calcium alanate ($Ca\ (AlH_4)_2$).

13. The detonable mixture of claim 1 wherein the reducing agent is an alloy or combination of magnesium and aluminum in a powdered, flaked or atomized state or combination thereof.

14. The detonable mixture of claim 1 wherein the mixture contains an additive in the form of a sensitizer to affect the mixture's shock sensitivity and rate of reaction on detonation.

15. The detonable mixture of claim 14 wherein the additive is selected from the group consisting of MMAN, RDX, PETN or HMX.

16. The detonable mixture of claim 1 wherein the amount of reducing agent in the detonable mixture is between about 20% to about 40% on a weight percentage basis.

17. Use of the detonable mixture of claim 1 to transform the carbon in carbon dioxide into diamonds and graphene via detonation.

18. Use of the detonable mixture of claim 1 as a mining explosive.

19. Use of the detonable mixture of claim 12 to produce, via detonation, a solid nano oxide.

20. Use of the detonable mixture of claim 1 to transform the carbon in carbon dioxide into diamonds via detonation by a) preparing a detonable charge comprising carbon dioxide (CO2) in the solid state and a reducing agent selected from the group consisting of powdered, flaked, atomized, alloys or combinations of elemental metals aluminum (Al), magnesium (Mg), lithium (Li), beryllium (Be), calcium (Ca), sodium (Na), titanium (Ti) and zirconium (Zr); powdered, flaked, atomized or combinations of non-metal elemental boron (B) and silicon (Si); powdered metal hydrides lithium hydride (LiH), sodium hydride (NaH), beryllium hydride ($BeH_2$), magnesium hydride ($MgH_2$), calcium hydride ($CaH_2$), aluminum hydride ($AlH_3$), lithium aluminum hydride ($LiAlH_4$), sodium aluminum hydride ($NaAlH_4$), magnesium alanate ($Mg(AlH_4)_2$) and calcium alanate ($Ca (AlH_4)_2$); liquid, supercritical or gaseous forms of diborane ($B_2H_6$) or silane ($SiH_4$) or any combinations of any of the listed reducing agents, wherein the charge has a neutral or positive oxygen balance calculated without including the carbon in the carbon dioxide; b) detonating the charge, thereby oxidizing the reducing agent and producing a material that contains diamond; and c) collecting by-products produced by the detonation.

21. Use according to claim 20 of a detonable mixture to transform the carbon in carbon dioxide into diamonds via detonation including separating the by-products produced by the detonation to collect the diamonds.

22. Use according to claim 19 of a detonable mixture to transform the carbon in carbon dioxide into diamonds and produce a solid nano oxide via detonation by a) preparing a detonable charge comprising carbon dioxide ($CO_2$) in the solid state and an effective amount of a reducing agent selected from the group consisting of powdered, flaked, atomized, alloys or combinations of elemental metals aluminum (Al), magnesium (Mg), lithium (Li), beryllium (Be), calcium (Ca), sodium (Na), titanium (Ti) and zirconium (Zr); powdered, flaked, atomized or combinations of non-metal elemental boron (B) and silicon (Si); powdered metal hydrides lithium hydride (LiH), sodium hydride (NaH), beryllium hydride ($BeH_2$), magnesium hydride ($MgH_2$), calcium hydride ($CaH_2$), aluminum hydride ($AlH_3$), lithium aluminum hydride ($LiAlH_4$), sodium aluminum hydride ($NaAlH_4$), magnesium alanate ($Mg(AlH_4)_2$) and calcium alanate ($Ca (AlH_4)_2$); liquid, supercritical or gases such as diborane ($B_2H_6$) or silane ($SiH_4$) or combinations thereof wherein the charge has a neutral or positive oxygen balance calculated without including the carbon in the carbon dioxide; b) detonating the charge thereby oxidizing the reducing agent and producing a material that contains an oxide; and c) collecting by-products produced by the detonation.

23. Use according to claim 22 of a detonable mixture to produce a solid nano oxide via detonation including separating the by-products produced by the detonation to collect the nano oxide.

24. A detonable mixture formulation comprising between about 65% to about 75% carbon dioxide ($CO_2$) in the solid state and a reducing agent selected from the group consisting of powdered, flaked, atomized, alloys or combinations of elemental metals aluminum (Al), magnesium (Mg), lithium (Li), beryllium (Be), calcium (Ca), sodium (Na), titanium (Ti) and zirconium (Zr); powdered, flaked, atomized or combinations of non-metal elemental boron (B) and silicon (Si); powdered metal hydrides lithium hydride (LiH), sodium hydride (NaH), beryllium hydride ($BeH_2$), magnesium hydride ($MgH_2$), calcium hydride ($CaH_2$), aluminum hydride ($AlH_3$), lithium aluminum hydride ($LiAlH_4$), sodium aluminum hydride ($NaAlH_4$), magnesium alanate ($Mg(AlH_4)_2$) and calcium alanate ($Ca(AlH_4)_2$); liquid, supercritical or gaseous forms of diborane ($B_2H_6$) or silane ($SiH_4$) or any combinations of any of the listed reducing agents.

25. A detonatable mixture suitable for blasting comprising carbon dioxide (CO2) in the solid state and between about 15% to about 50% weight per weight at least one reducing agent selected from the group consisting of powdered, flaked, atomized, alloys or combinations of elemental metals aluminum (Al), magnesium (Mg), lithium (Li), beryllium (Be), calcium (Ca), sodium (Na), titanium (Ti) and zirconium (Zr); powdered, flaked, atomized or combinations of non-metal elemental boron (B) and silicon (Si); powdered metal hydrides lithium hydride (LiH), sodium hydride (NaH), beryllium hydride (BeH2), magnesium hydride (MgH2), calcium hydride (CaH2), aluminum hydride (A1H3), lithium aluminum hydride (LiA1H4), sodium aluminum hydride (NaAlH4), magnesium alanate (Mg(AlH4)2) and calcium alanate (Ca(AlH4)2); liquid, supercritical or gaseous forms of diborane (B2H6) or silane (SiH4) or any combinations of any of the listed reducing agents.

* * * * *